United States Patent [19]

Solomon

[11] Patent Number: 5,154,820

[45] Date of Patent: Oct. 13, 1992

[54] REVERSE OSMOSIS SYSTEM WITH CYCLED PRESSURE INTENSIFIERS

[75] Inventor: Donald F. Solomon, Hemet, Calif.

[73] Assignee: Product Research and Development, Santa Ana, Calif.

[21] Appl. No.: 538,131

[22] Filed: Jun. 13, 1990

Related U.S. Application Data

[63] Continuation-in-part of Ser. No. 350,521, May 11, 1989, Pat. No. 5,000,845, which is a continuation-in-part of Ser. No. 111,697, Oct. 21, 1987, Pat. No. 4,836,924.

[51] Int. Cl.$^5$ ............................................. C02F 1/44
[52] U.S. Cl. ................................. 210/134; 210/321.87; 210/416.1
[58] Field of Search ............... 210/134, 90, 110, 137, 210/416.1, 321.66, 321.87; 91/275

[56] References Cited

U.S. PATENT DOCUMENTS

| | | | |
|---|---|---|---|
| 2,500,624 | 3/1950 | Bailey | 103/48 |
| 3,825,122 | 7/1974 | Taylor | 210/134 |
| 4,124,488 | 11/1978 | Wilson | 210/134 |
| 4,187,173 | 2/1980 | Keefer | 210/136 X |
| 4,288,326 | 9/1981 | Keefer | 210/637 |
| 4,348,161 | 9/1982 | Shibata | 417/403 |
| 4,367,140 | 1/1983 | Wilson | 210/110 |
| 4,410,429 | 10/1983 | Harvey et al. | 210/416.1 |
| 4,498,982 | 2/1985 | Skinner | 210/96.2 |
| 4,632,754 | 12/1986 | Wood | 210/416.1 X |
| 4,645,599 | 2/1987 | Fredkin | 210/416.1 |
| 4,836,924 | 6/1989 | Solomon | 210/416.1 X |
| 4,924,671 | 5/1990 | Reinert | 91/275 X |
| 5,000,845 | 3/1991 | Solomon | 210/134 |

FOREIGN PATENT DOCUMENTS

| | | |
|---|---|---|
| 1176572 | 10/1984 | Canada . |
| 0028913 | 11/1980 | European Pat. Off. . |
| 3101694 | 8/1982 | Fed. Rep. of Germany . |
| 2088968 | 10/1980 | United Kingdom . |

*Primary Examiner*—Frank Spear
*Attorney, Agent, or Firm*—Gordon L. Peterson

[57] ABSTRACT

A reverse osmosis system comprising a reverse osmosis filter having an inlet port connectible to a source of feedwater under pressure via a feedwater inlet conduit, a product water outlet port for filtered product water and brine outlet port for brine. First and second pressure intensifiers are coupled to the feedwater inlet conduit between the source of feedwater and the inlet port of the reverse osmosis filter. Each of the pressure intensifiers includes a pumping member having a pumping stroke and a return stroke. A control valve in the feedwater inlet conduit controls which of the pressure intensifiers receives feedwater under pressure. The control valve is driven by particular fluid pressures in the first and second pressure intensifiers so that feedwater is alternately supplied to the first and second pressure intensifiers.

16 Claims, 6 Drawing Sheets

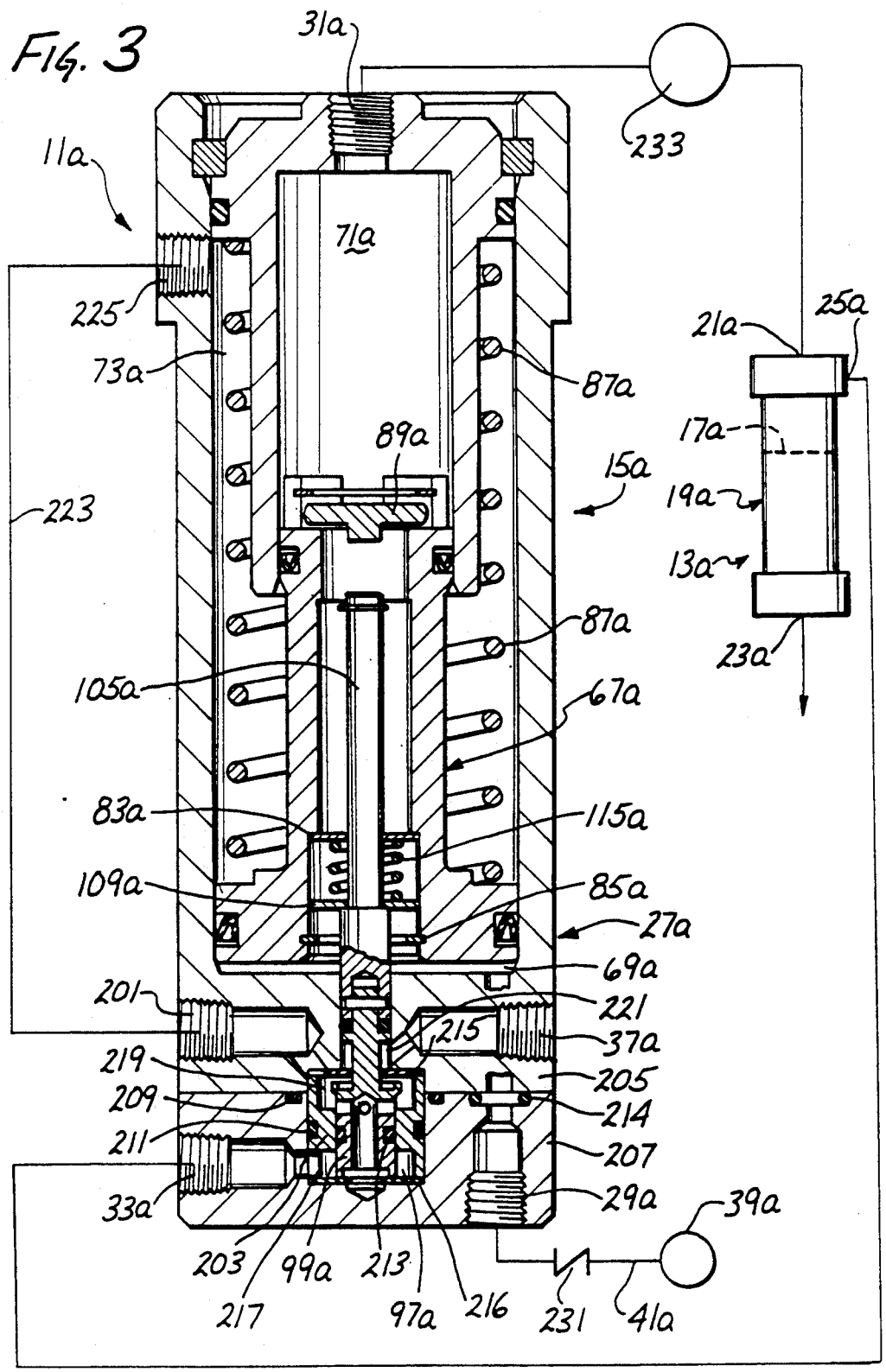

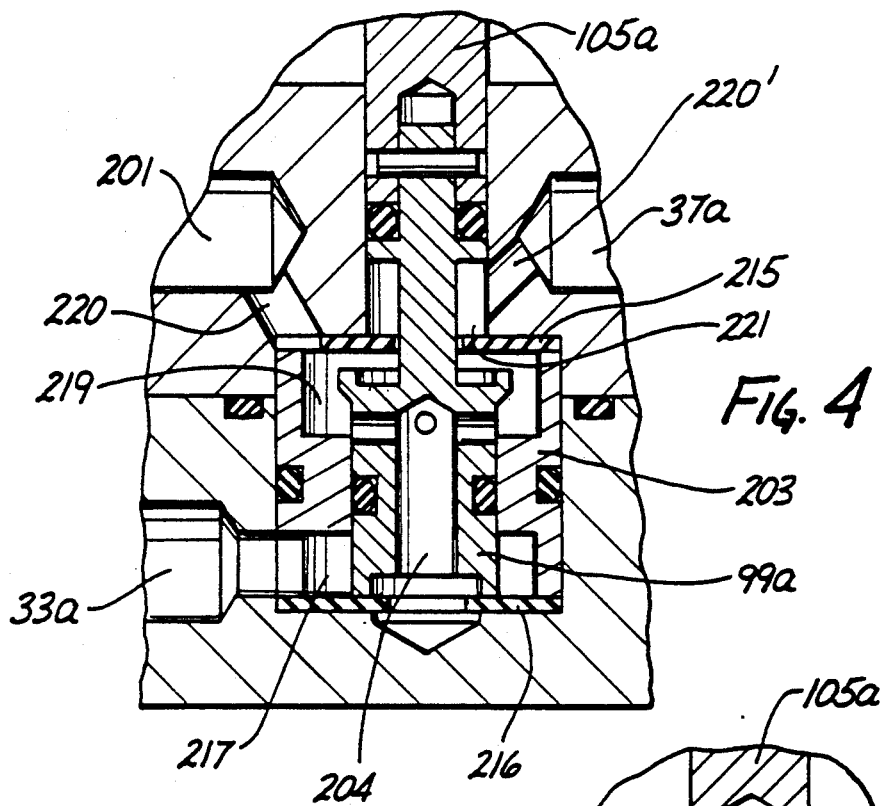
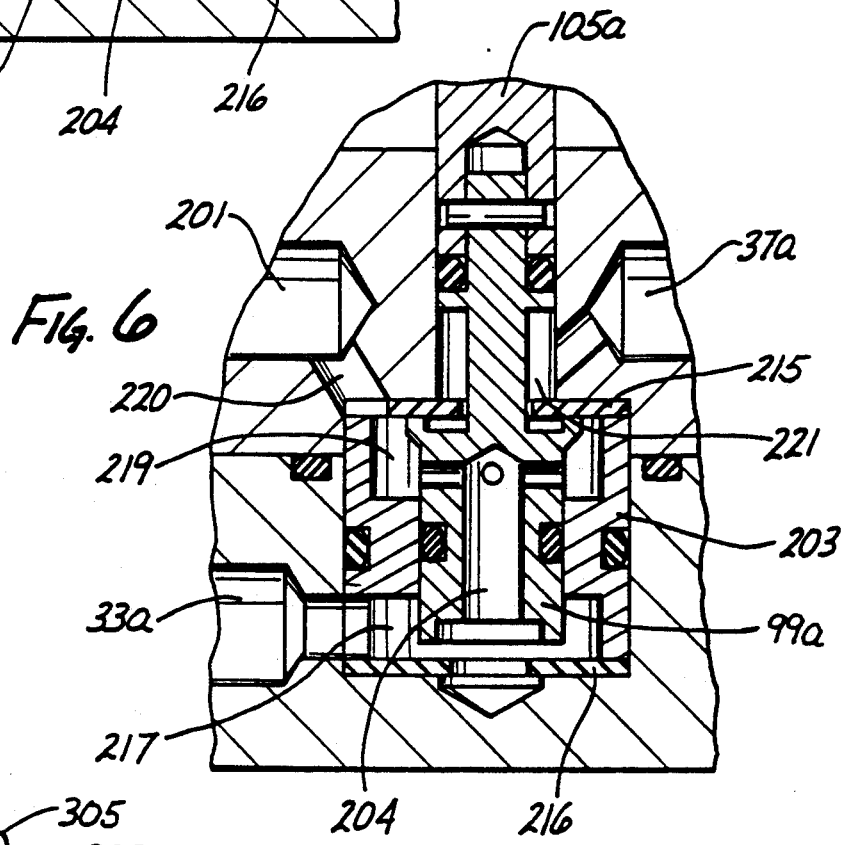
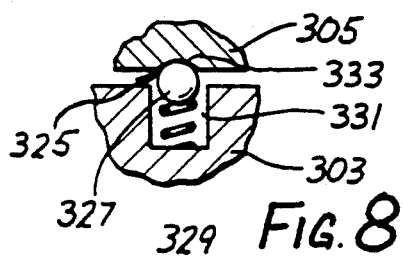

REVERSE OSMOSIS SYSTEM WITH CYCLED PRESSURE INTENSIFIERS

BACKGROUND OF THE INVENTION

This application is a continuation-in-part of application Ser. No. 350,521 filed May 11, 1989, entitled Reverse Osmosis System And Automatic Cycling Booster Pump Therefor, now U.S. Pat. No. 5,000,845 which in turn is a continuation-in-part of application Ser. No. 111,697 filed 21, 1987, entitled Reverse Osmosis System And Automatic Cycling Booster Pump Therefor, now U.S. Pat. No. 4,836,924 issued Jun. 6, 1989.

Reverse osmosis systems are commonly used for removing impurities from water, such as drinking water. A conventional reverse osmosis system includes a reverse osmosis filter having a reverse osmosis membrane. Feed water is supplied to the filter, and the filter delivers filtered product water having a reduced impurity content. Not all of the feed water supplied to the filter passes through the reverse osmosis membrane, and this unfiltered water, or brine, can be discharged to drain or a portion of it can be recycled through the filter.

To increase the throughput, i.e., the volume of product water, it is known to employ a pump to increase the pressure of the feed water supplied to the reverse osmosis filter. A conventional electric motor driven pump is used for this purpose. Motor driven pumps increase installation costs by requiring electrical wiring to the pump. In addition, they are subject to higher operational costs due to the cost of electricity and the cost of maintaining and repairing or replacing the electrical motor.

My U.S. Pat. No. 4,836,924 and my copending Ser. No. 350,521 disclose pumps or pressure intensifiers which are driven by the feedwater to increase the pressure of the feedwater supplied to the reverse osmosis filter. Each of these pressure intensifiers employs a pumping member driven on a pumping stroke by the feedwater under pressure to increase the pressure of the feedwater so that the reverse osmosis filter receives feedwater at increased pressure. The pumping member is also movable on a return stroke without increasing the pressure of the feedwater. When using a pump or pressure intensifier of this type, the reverse osmosis filter is supplied with feedwater at increased pressure during the pumping stroke but not during the return stroke.

In order to continuously supply feedwater at boosted pressure to the reverse osmosis filter, it is known to employ two pressure intensifiers driven out of phase, with each of the pressure intensifiers supplying boosted pressure feedwater to the reverse osmosis filter during a pumping stroke. Systems of this type are shown, for example, in Wilson U.S. Pat. No. 4,367,140 and published U.K. patent application No. GB 2,088,968 A.

In order to utilize two pressure intensifiers in this manner, it is necessary to appropriately sequence the pumping and return strokes of the two pressure intensifiers. The systems disclosed in the Wilson patent and the British application employ relatively complex techniques for sequencing the pressure intensifiers.

SUMMARY OF THE INVENTION

This invention utilizes a control valve for sequencing the operation of the first and second pressure intensifiers thereby achieving substantial simplification in control of multiple pressure intensifiers. With this invention, the control valve controls which of the pressure intensifiers receives feedwater under pressure, and because the pressure intensifiers are driven by the feedwater under pressure, this can be used to control the sequencing.

Another feature of this invention is that the control valve is driven by particular fluid pressures which are inherent in the first and second pressure intensifiers. These pressures cause the control valve to alternately supply feedwater to the first and second pressure intensifiers. This provides further simplification in that both the control of the control valve and the power to operate the control valve are obtained from fluid pressures inherent in the system.

A reverse osmosis system constructed in accordance with this invention may include a reverse osmosis filter having an inlet port connected to a source of feedwater under pressure via a feedwater inlet conduit, a product water outlet port for filtered product water and a brine outlet port for brine. The system also includes first and second pressure intensifiers coupled into the feedwater inlet conduit between the source of feedwater and the inlet port of the reverse osmosis filter. Each of the pressure intensifiers includes a pumping member driven on a pumping stroke by the feedwater under pressure to increase the pressure of the feedwater so the reverse osmosis filter receives feedwater at an increased pressure and movable on a return stroke without increasing the pressure of the feedwater.

In order that the control valve can control which of the pressure intensifiers receives feedwater under pressure, it is preferably located in the feedwater inlet conduit between the source and the pressure intensifiers.

The particular fluid pressure which drives the control valve is preferably brine pressure. The brine pressure is high at a pressure intensifier which is on its return stroke and low at a pressure intensifier on its pumping stroke. This differential pressure can be used to both control and drive the control valve such that the control valve supplies feedwater under pressure to the intensifier which is to be driven on the pumping stroke.

In one preferred construction of the pressure intensifier, each of the pumping members has a first relatively large-area face drivable by the feedwater under pressure, a second smaller area face for increasing the pressure of the feedwater and a reversing face coupled to the brine outlet port of the reverse osmosis filter. In this event, the particular pressure or brine pressure is the pressure at the reversing face.

In one preferred construction, conduit means couples the brine outlet port of the reverse osmosis filter to the first and second pressure intensifiers so that the brine can act on the pumping members of the pressure intensifiers. A first brine valve controls the flow of brine from the conduit means to the pumping member of the first pressure intensifier, and a second brine valve controls the flow of brine from the conduit means to the pumping member of the second pressure intensifier. In this event, the control valve is responsive to the brine pressure between the first brine valve and the pumping member of the first pressure intensifier and the brine pressure between the second brine valve and the pumping member of the second pressure intensifier.

In order that the control valve can respond to the differential brine pressure, the control valve may include a valve body and a valve element movable in the valve body to control which of the first and second pressure intensifiers receives feedwater under pressure. The valve element has oppositely facing faces coupled to receive the respective brine pressures from the pressure intensifiers. The differential brine pressures can control the position of the valve element and drive the valve element. Preferably, the valve element is a spool, and the oppositely facing faces are on the spool.

Each of the brine valves preferably blocks the flow of brine from the associated pressure intensifier to drain during the return stroke of the pumping member of the associated pressure intensifier and allows the flow of brine from the brine outlet port of the filter to the associated pressure intensifier during the return stroke of the pumping member of the associated pressure intensifier.

The invention, together with additional features and advantages thereof, may best be understood by reference to the following description taken in connection with the accompanying illustrative drawings.

BRIEF DESCRIPTION OF THE DRAWING

FIG. 3 is a view similar to FIG. 1 illustrating a second preferred embodiment of the reverse osmosis system and pump, with the piston being illustrated at the beginning of the pumping stroke.

FIG. 4 is an enlarged, fragmentary sectional view illustrating the brine valve and the adjacent structure.

FIG. 6 is a view similar to FIG. 4 illustrating the position of the brine valve when the piston is at the end of the pumping stroke.

FIG. 8 is an enlarged fragmentary sectional view of a portion of the control valve.

DESCRIPTION OF THE PREFERRED EMBODIMENT

Figure 1:
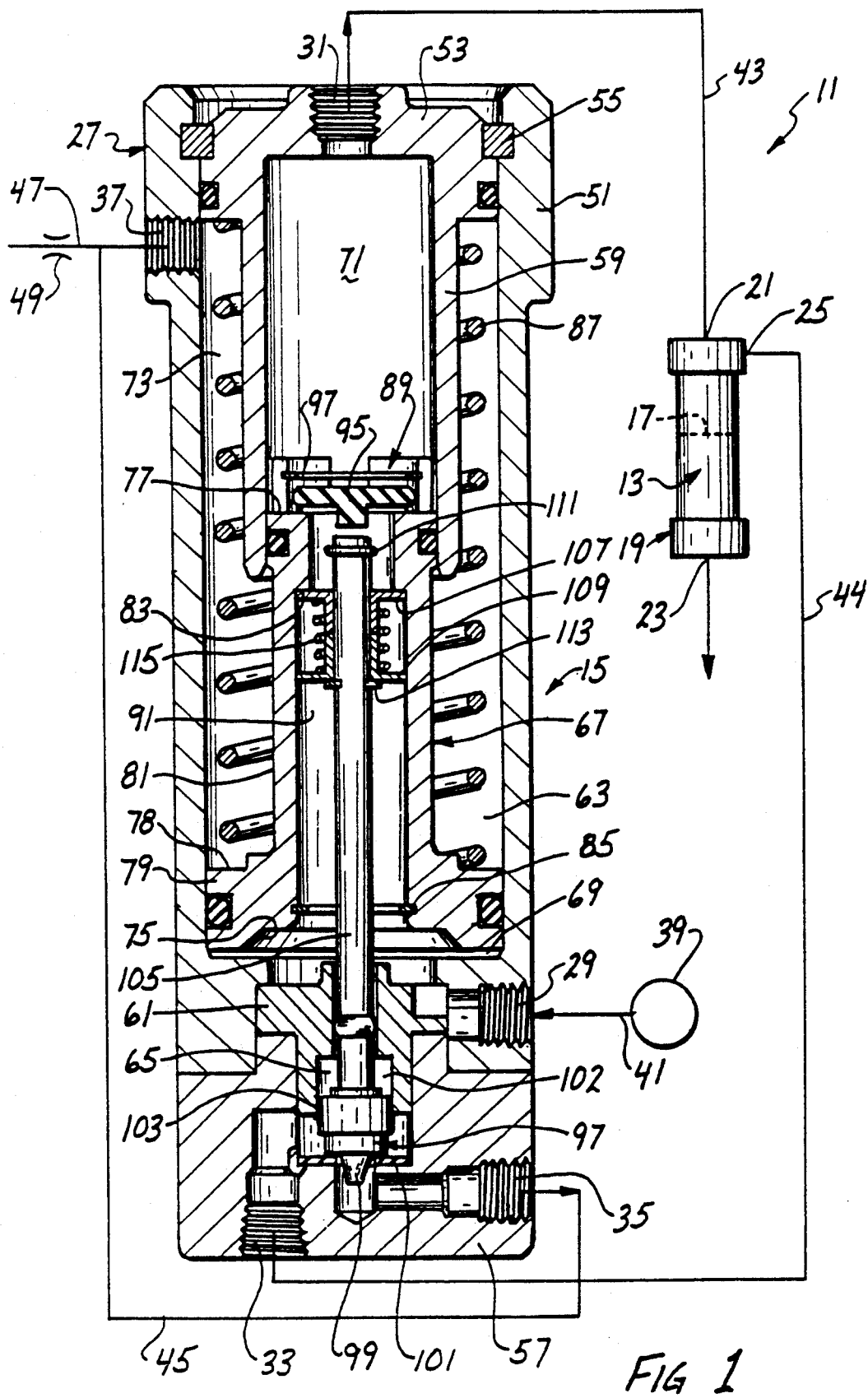
FIG. 1 is a schematic view partially in section illustrating a reverse osmosis system and one preferred embodiment of pump, which is driven by feed water under pressure. The piston is shown at the beginning of the pumping stroke.

The drawing shows a reverse osmosis system 11 which comprises a reverse osmosis filter 13 and a pump or pressure intensifier 15. The reverse osmosis system 11 is conventional and includes a reverse osmosis membrane 17 within a housing 19. The housing 19 has an inlet port 21, a product water outlet port 23 and a brine outlet port 25.

The pump 15 includes a housing 27 having a feed water inlet port 29, a feed water outlet port 31, brine inlet port 33, a brine outlet port 35 and a drain or reversing port 37. The inlet port 29 is coupled to a source 39, such as a pump and/or a city water supply, of feed water under pressure by a conduit 41, and the outlet port 31 is coupled by a conduit 43 to the inlet port 21 of the filter 13. Together, the conduits 41 and 43 constitute an inlet conduit which extends between the source 39 of feed water and the inlet port 21 of the filter.

A conduit 44 joins the brine outlet port 25 with the brine inlet port 33. A conduit 45 joins the brine outlet port 35 with the drain port 37. A drain conduit 47 extends from the conduit 45 to drain. A restricted orifice 49 is provided in the drain conduit 47.

Although various constructions are possible, in the preferred embodiment, the housing 27 includes a main body 51, an end section 53 containing the port 31 and attached to the main body by a retaining ring 55 and an end section 57 containing the ports 33 and 35 and suitably attached to the other end of the main body 51 in any suitable manner. The end section 53 has a sleeve portion 59. The interior of the housing 27 is hollow, and a partition 61 is retained between the main body 51 and the end section 57 and divides the interior of the housing into cavities 63 and 65 on opposite sides of the partition.

A piston 67 is reciprocable in the cavity 63, and divides the cavity into an inlet chamber 69 communicating with the inlet port 29, an outlet chamber 71 communicating with the outlet port 31, and a reversing chamber 73 communicating with the drain port 37. The piston 67 is a differential area piston and has a relatively large area face 75 in the inlet chamber 69 and a smaller area face 77 in the outlet chamber 71. The piston 67 also has a reversing face 78 in the reversing chamber 73. The faces 75 and 78 are on an enlarged head 79 that sealingly slides along the peripheral wall of the inlet chamber 69 and the reversing chamber 73. The face 77 is provided, in this embodiment, as an end face of a tubular stem 81 which is sealingly slidable within the sleeve portion 59 of the end section 53. The main body 51, the sleeve portion 59 and the stem 81 are preferably coaxial. The stem 81 has an annular internal shoulder 83 adjacent the face 77. A shoulder 85 is adjacent the face 75 and, in this embodiment, is provided by an end surface of a snap ring carried by the piston 67. A coil compression spring 87 acts between the end section 53 and the head 79 of the piston 67 to urge the piston downwardly as viewed in the drawing.

A check valve 89 is carried by the piston 67 at the face 77. The stem 81 has a passage 91 extending through it, and the check valve 89 closes and opens the upper (as viewed in the drawing) end of the passage 91. The check valve 89 may be of any kind which will open when the pressure in the passage 91 is greater than the pressure in the outlet chamber 71. In the embodiment illustrated, the check valve 89 comprises an open cage 93 suitably attached to the stem 81 at the face 77 and a resilient valve element 95 loosely axially retained within the cage and on the face 77. Accordingly, when the fluid pressure in the passage 91 exceeds the fluid pressure in the outlet chamber 71, the fluid pressure in the passage 91 forces the valve element 95 upwardly as viewed in the drawing to allow fluid flow from the passage 91 to the outlet chamber 71. Conversely, when the pressure differential across the valve element is reversed, the valve element 95 is seated tightly against the face 77 to preclude flow between the outlet chamber 71 and the passage 91.

A brine valve 97 controls the flow of brine from the brine inlet port 33 to the brine outlet port 35. Although the brine valve 97 may be remote from the piston 67, in this embodiment, they are closely adjacent and within the same housing. The brine valve 97 also performs a control function for the pump 15 and, therefore, may be considered as part of the pump and within the pump housing even if it is located remotely from the piston 67.

The brine valve 97 includes a valve element 99 and a valve seat 101 of a soft, compliant material on the end section 57 of the housing 27. The valve element 99 is movable between a closed position shown in the drawing in which the valve element 99 seats on the valve seat 101 and an open position in which the valve element 99 is moved upwardly as shown in the drawing and is axially spaced from the valve seat 101 to thereby allow the flow of brine from the brine inlet port 33 to the brine outlet port 35. The valve element 99 cooperates with the housing to define a valve chamber 102 above (as viewed in FIG. 1) the valve element. A bleed passage 103 between the valve element 99 and the partition 61 allows for the flow of brine from the brine inlet port 33 into the chamber 102. Thus, the valve element 99 has a face in the chamber 102 which is exposed to brine at brine pressure and an opposite face which is exposed to fluid at drain pressure existing in the conduit 45.

The brine valve 97 is opened and closed by movement of the piston 67, and for this purpose, the brine valve and the piston are resiliently drivingly coupled together. Although this can be accomplished in different ways, in this embodiment, the connection is provided by a rod 105 coupled to the valve element 99 and extending in sealed relationship through a bore of the partition 61 into the passage 91. The coupling means also includes collars 107 and 109 slidable on the rod 105 between retaining rings 111 and 113, which are fixed on the rod 105, and a coil compression spring 115 between the collars and resiliently urging the collars away from each other. The coupling means also includes the shoulders 83 and 85.

To start up the system 11, it is only necessary to turn on the source 39 of feed water under pressure, and this can be done, for example, by opening an appropriate valve or water tap and/or turning on a pump (not shown). Of course, as is common for virtually all liquid-operated devices, it would be desirable to first bleed air from the system so that all appropriate lines and components are filled with water. Although air-bleeding techniques are well known, by way of example, the feed water from the source 39 could be turned on with the conduit 44 partly decoupled from the brine inlet port 33 to allow water to flow through and fill the chamber 71, the conduits 43 and 44 and the filter 13.

In use, feed water is supplied from the source 39 through the conduit 41 and the feed water inlet port 29 to the inlet chamber 69. As shown in the drawing, the piston 67 is at the lowermost position, and water at drain pressure acts in the reversing chamber 73 against the face 78 of the piston in conjunction with the spring 87 to tend to hold the piston in this lowermost position. Assuming that the outlet chamber 71 is charged with feed water, the feed water at inlet pressure acting over the relatively large face 75 is sufficient to move the piston 67 on a pumping stroke (upwardly as viewed in the drawing) to pressurize the water in the outlet chamber 71 and to force the pressurized feed water through the conduit 43 to the inlet port 21 of the filter 13. In so doing, the pump 15 boosts the pressure of the water at the source 39 to a higher pressure and delivers it to the filter 13. During the pumping stroke of the piston 67, the brine valve 97 remains closed due to the differential fluid pressure acting across the valve element 99 and the pressure on the upper end of the rod, and initially the spring 115 is compressed between the collars 107 and 109 to further urge the valve 97 toward the closed position. However, the spring 115 expands to move the collar 107 into engagement with the ring 111 as the pumping stroke progresses.

The reverse osmosis membrane 17 removes impurities from the water supplied to the filter 13 and delivers it to the outlet port 23 as filtered product water. Because the brine valve 97 is closed, no brine can flow from the filter 13 to drain, and consequently, the piston 67 moves on the pumping stroke to provide make up feed water at the same rate that product water is discharged at the outlet port 23.

Figure 2:
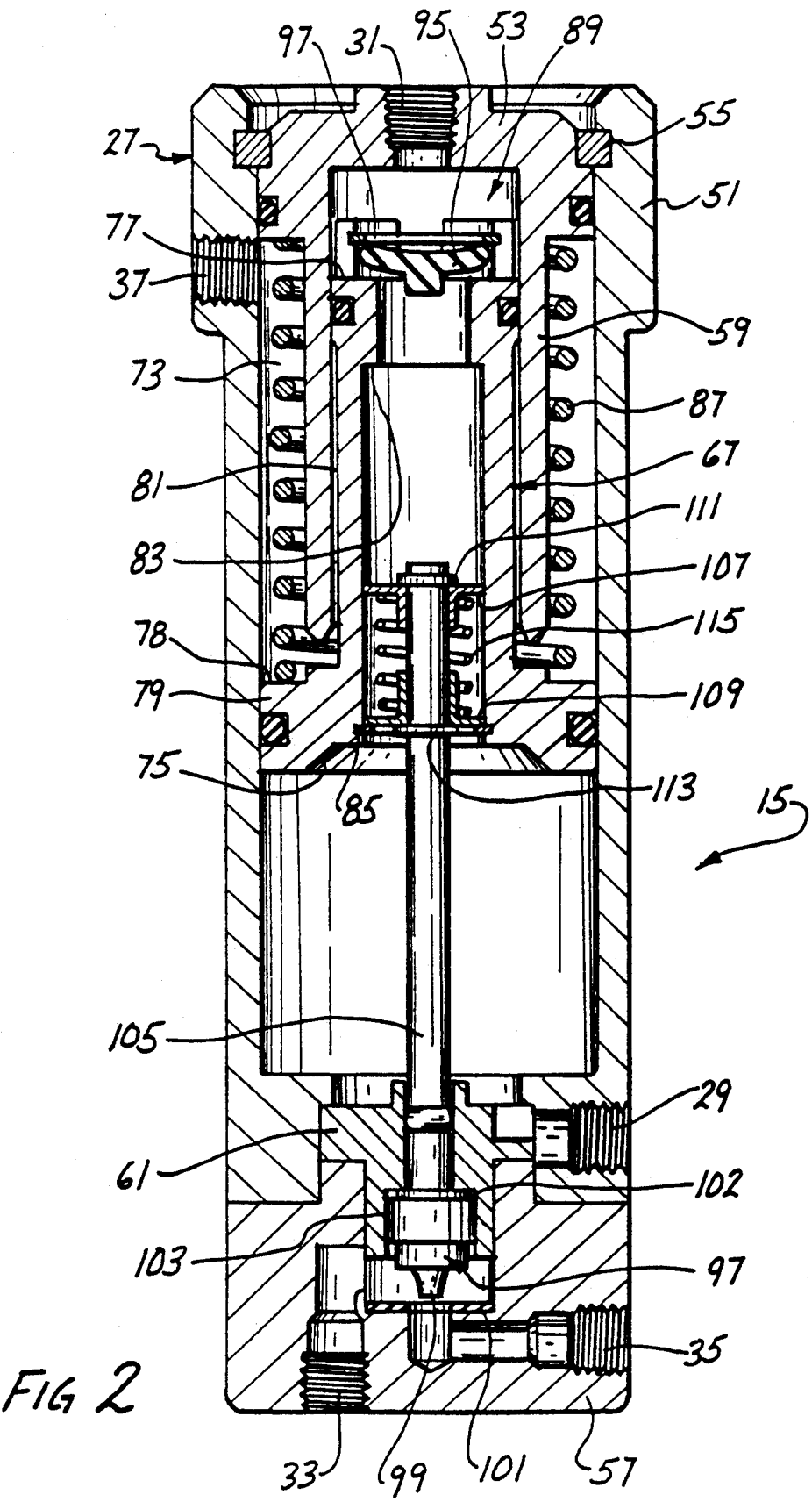
FIG. 2 is a fragmentary sectional view showing a portion of FIG. 1, with the piston at the end of its pumping stroke.

As the piston 67 nears the end of the pumping stroke, i.e., approaches the position of FIG. 2, the shoulder 85 engages the collar 109 to compress the spring 115. This exerts an upward force on the valve element 99 and when this upward force is sufficient to overcome the valve closing force resulting from the differential pressure acting across the valve element 99, the valve element 99 is lifted off the seat 101 and is driven by the spring 115 to the fully open position after termination of the pumping stroke.

In any event, with the brine valve 97 open, brine can now flow through the conduit 44, the brine inlet port 33, the brine outlet port 35 and the conduit 45 to both the reversing chamber 73 and the orifice 49. Although the conduit 45 is open to drain via the conduit 47, the presence of the restricted orifice 49 in the conduit 47 prevents the pressure in the conduit 45 and the pressure within the reversing chamber 73 from dropping all the way to drain pressure, which may be essentially zero psig. Consequently, there is a significant pressure increase in the reversing chamber 73, and this pressure acts across the relatively large area face 78. In addition, the opening of the brine valve 97 reduces the pressure in the filter 13, the conduit 43 and the outlet chamber 71 to less than the pressure of the feed water in the inlet chamber 69. Consequently, the differential pressure acting across the check valve 89 lifts the valve element 95 to allow water to flow from the inlet chamber 69 to the outlet chamber 71. During the return stroke, the check valve 89 is held open by feed water pressure because the brine valve 97 is open so the chamber 71 communicates with drain pressure.

The effect of this is twofold. First, the opening of the check valve 89 places the face 77 essentially at the pressure of the feed water from the source 39, and this is a pressure increase relative to the pressure which existed in the outlet chamber 71 immediately prior to opening of the check valve 89. Accordingly, the increased pressure in the outlet chamber 71 and the reversing chamber 73 in conjunction with the force of the spring 87 are sufficient to move the piston 67 downwardly on its return stroke against the force of the feed water acting against the face 75.

Secondly, the opening of the check valve 89 enables the outlet chamber 71 to be recharged with feed water on the return stroke. Consequently, on the next pumping stroke, the outlet chamber 71 is charged with water which can be delivered at boosted pressure to the filter 13.

During the return stroke of the piston 67, water that cannot be contained in the chamber 71 is flushed through the filter 13 with an advantageous flushing action on the membrane 17. This is possible because, during the return stroke, the brine valve 97 is open (FIG. 2) so that there is an open flow path between the chamber 71 and the orifice 49 (FIG. 1) which leads to drain.

As the piston 67 nears the end of the return stroke, the shoulder 83 contacts the collar 107 and compresses the spring 115 to thereby provide a resilient closing force on the valve element 99. When the spring is compressed sufficiently, it generates an adequate closing force to move the valve element 99 downwardly into sealing engagement with the seat 101 to thereby close the brine valve 97. However, the spring 115 closes the valve 97 after termination of the pumping stroke. This restores the conditions which existed at the beginning of the first pumping stroke described above so that the operation can be repeated.

From the foregoing, it is apparent that movement of the piston 67 is used to open and close the brine valve 97. Also, opening of the brine valve 97 brings about termination of the pumping stroke, and closing of the brine valve 97 brings about termination of the return stroke. Reversal of movement of the piston 67 at the end of the pumping stroke is brought about by increasing the pressure within the cavity 63 and chamber 71.

The valve chamber 102 and the bleed passage 103 act like a dashpot to retard movement of the valve element 99 toward either the open or closed position. This relatively slower movement of the valve element 99 in conjunction with the spring 115 assures that the piston 67 will complete its stroke before movement of the valve element 99 is completed.

During the return stroke, feed water at boosted pressure is no longer being supplied to the filter 13. Consequently, the length of time to accomplish the return stroke and to reseat or close the brine valve 97 should be minimized. With this invention, the forces acting on the piston 67 as described above enable the return stroke to be accomplished in a minimum length of time, such as, for example, 1.5 to 2 seconds. By way of example, the pumping stroke may last 1.5 minutes, and in this event, the portion of the cycle time devoted to the return stroke and to closing of the brine valve 97 is minimal.

FIGS. 2-6 show a system 11a which is identical to the system 11 in all respects not shown or described herein. Portions of the system 11a corresponding to portions of the system 11 are designated by corresponding reference numerals followed by the letter "a."

The primary differences between the systems 11a and 11 is that the former does not have the restricted orifice 49, and the brine valve 97a controls flow among the brine port 33a, the drain port 37a and a reversing chamber port 201. In addition, the dashpot, i.e., the cavity 65 and the bleed passage 103 of the system 11 are eliminated in the system 11a, and the spring 115a is retained in a different manner.

Functionally, the primary difference between the systems 11a and 11 is that the brine valve 97a blocks flow of brine from the reversing chamber 73a to the drain port 37a during the return stroke of the piston 67a.

Figure 5:
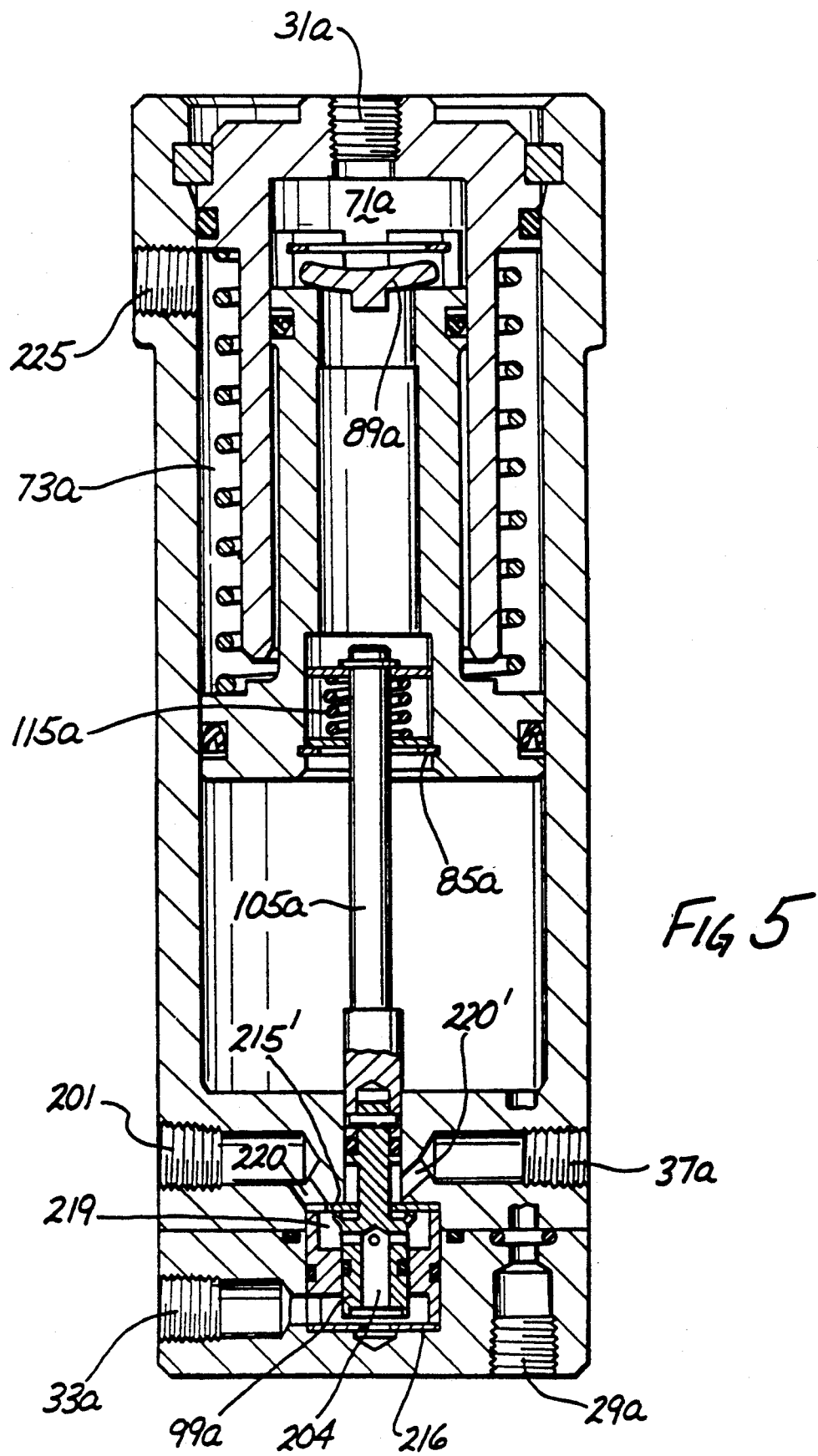
FIG. 5 is a view similar to FIG. 2 showing the second embodiment of the invention with the piston at the end of its pumping stroke.

The brine valve 97a has a valve element 99a coupled to the rod 105a and movable therewith between the position of FIGS. 3 and 4 and the position of FIGS. 5 and 6. The valve element 99a has a passage 204 extending therethrough and is movable in a mounting member 203 which is suitably retained within the housing 27a. As shown in FIG. 3, the housing 27a may comprise housing sections 205 and 207 held together by fasteners (not shown), with the mounting member 203 captured between the housing sections. Annular seals 209, 211, 213 and 214 seal between surfaces as shown in FIG. 3. Annular, resilient valve seats 215 and 216 are retained between the mounting member 203 and the housing section 205.

The brine port 33a and the reversing chamber port 201 lead to chambers 217 and 219, respectively, and the drain port 37a leads to a drain at essentially zero pressure and to a chamber 221 above the valve seat 215. With the brine valve 97a in the position shown in FIGS. 3 and 4, the lower end of the valve element 99a engages the valve seat 216 to block communication between the chambers 217 and 219 so that the brine port 33a does not communicate with either of the ports 37a or 201. However, the valve element 99a is spaced from the valve seat 215 to provide communication between the ports 37a and 201 via openings 220 and 220' and the chamber 219 as best shown in FIG. 4.

With the brine valve 97a in the position shown in FIGS. 5 and 6, the valve element 99a is spaced from the valve seat 216 to provide communication between the brine port 33a and the reversing chamber port 201 via the chamber 217, the passage 204 in the valve element 99a, the chamber 219 and the opening 220 leading to the port 201. In addition, the valve element 99a engages the valve seat 215 to block communication between the drain port 37a and both of the ports 33a and 201.

As shown in FIGS. 3 and 5, the reversing chamber port 201 is coupled via a conduit 223 to another reversing chamber port 225, which leads directly into the reversing chamber 73a. Although the ports 201 and 205 may be separate ports interconnected by a conduit as shown in the drawings, obviously the port 201 may lead directly into the reversing chamber 73a, and so functionally, the ports 201 and 225 and the conduit 223 simply serve to communicate the reversing chamber 73a with the brine valve 97a.

In this embodiment, the spring 115a is retained farther down on the piston 67a, and for this purpose, the shoulder 83a is relatively farther down on the piston than is the shoulder 83. In addition, the collar 109a is retained on an integral shoulder on the rod 105a.

The system 11a also includes a check valve 231 in the pump or pressure intensifier 15a adjacent the inlet port 29 or in the conduit 41a between the source 39a and the pump. The check valve 231 allows flow from the source 39a to the pump or pressure intensifier 15a and prevents flow in the reverse direction. The check valve prevents the high pressure existing in the inlet chamber 69a during the return stroke from backflowing toward the source 39a, which may be a city water line.

Also, an accumulator 233 may be provided between the feed water outlet port 31a and the inlet port 21a of the filter 13a. The accumulator 233, which may be of conventional construction, allows the water under pressure from the outlet port 31a of the pump 15a to compress air in the accumulator in a known manner to thereby store energy in the compressed gas. During the return stroke, the accumulator 233 releases some of the stored energy to help maintain pressure at the filter 13 somewhat higher during the return stroke.

The operation of the system 11a is essentially identical to the operation of the system 11, except that the brine valve 97a blocks flow of brine from the reversing chamber 73a to the drain port 37a throughout the return stroke whereas, in the embodiment of FIGS. 1-2, some brine could flow to drain through the restricted orifice 49 during the return stroke. Also, the system 11a does not have a dashpot associated with the brine valve 97a, and so the function described above for the cavity 65 and the bleed passage 103 are not present in the system 11a. In other respects, the operation of the system 11a is essentially the same as the operation of the system 11.

Briefly, during the pumping stroke, the reversing chamber 73a is at atmospheric or drain pressure because it communicates with the drain port 37a while the pressure in the outlet chamber 71a is high because it is multiplied by the differential area piston 67a. Also during the pumping stroke, water from the outlet chamber 71a is forced under high pressure to and through the membrane 17a as the liquid in the reversing chamber 73a is dumped to drain, and water from the source 39a enters the inlet chamber 69a. Also, the spring is compressed. During the return stroke, the system is shut off from the drain 37a, and essentially the same high fluid pressure exists in the outlet chamber 71a, the reversing chamber 73a and the inlet chamber 69a. The energy stored in the spring 87a moves the piston 67a on the return stroke, and the water from the inlet chamber 69a moves through the check valve 89a and flows to the filter 13a to provide a flushing action through the filter and the membrane 17a. From there, the water moves to the reversing chamber 73a through the valve 99a and the conduit 223.

Of course, the brine valve 97a need not be in the housing 27a as it is only necessary that the brine valve be able to control flow from the brine outlet port 25a to the reversing chamber 73a and from the reversing chamber to drain. Although a single brine valve can accomplish these flow control functions most efficiently, the brine valve may include multiple valves, if desired.

Figure 7:
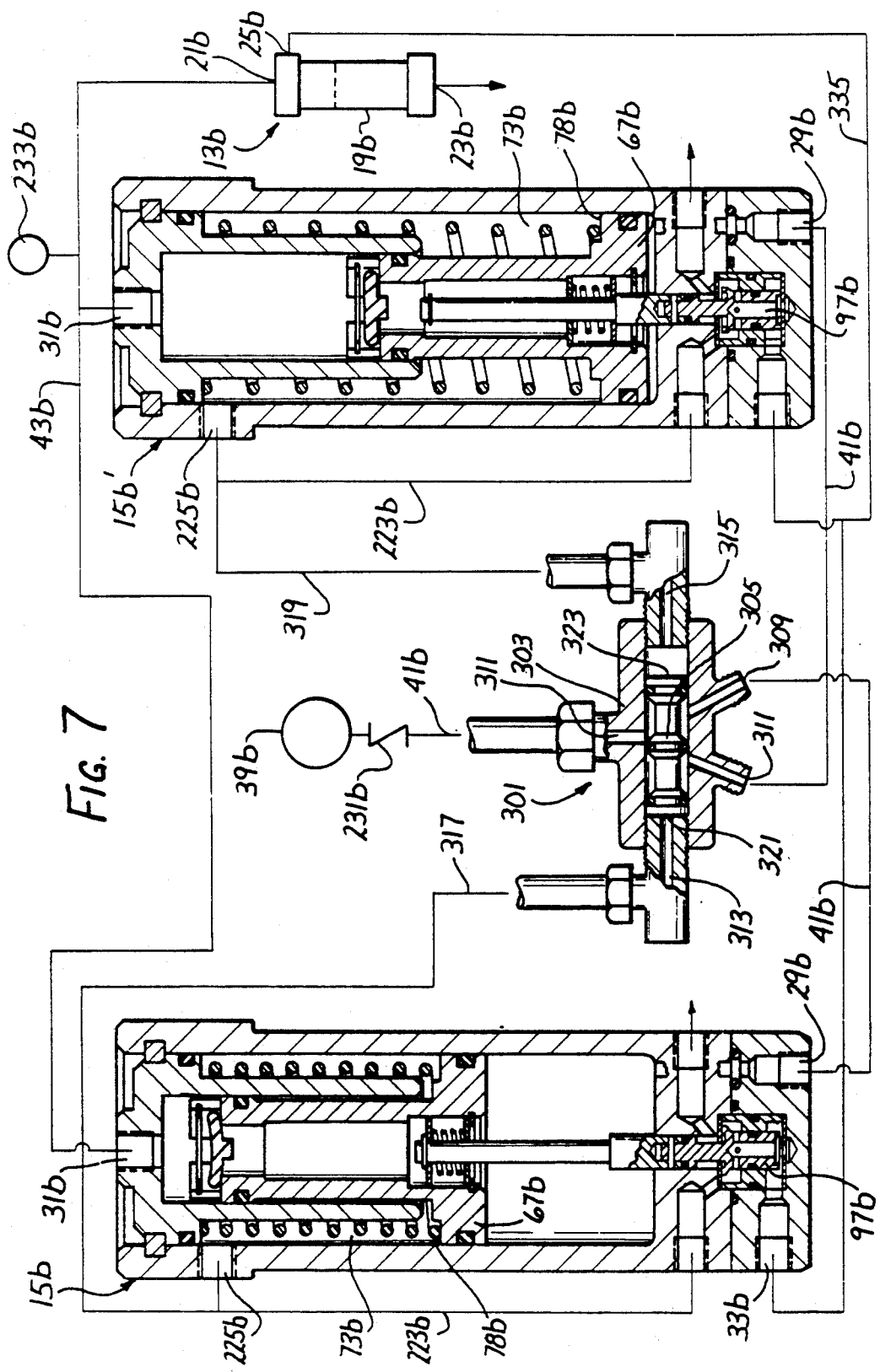
FIG. 7 illustrates a reverse osmosis system in which two of the pumps or pressure intensifiers are used to boost the pressure of the feedwater supplied to the reverse osmosis filter.

FIG. 7 shows a reverse osmosis system 11b which comprises identical pressure intensifiers or pumps 15b and 15b', a control valve 301 and conduits for interconnecting the pressure intensifiers and the control valve. With the system 11b, the pressure intensifiers 15b and 15b'are sequenced by the control valve 301 such that the pumping member or piston 67b of one pressure intensifier is on a pumping stroke while the piston 67b of the other pressure intensifier is on a return stroke. Accordingly, the reverse osmosis filter 13b is continuously supplied with feedwater at increased pressure.

In this embodiment, the pressure intensifiers 15b and 15b' are identical to each other and are identical to the pump or pressure intensifier 15a of FIGS. 3–6. Portions of the pressure intensifiers 15b and 15b' corresponding to portions of the pressure intensifier 15a are designated by identical reference numerals followed by the letter "b."

The control valve 301 includes a valve body 303 and a valve element in the form of a spool 305 slidable in the valve body. The valve body 303 has an inlet 307, outlets 309 and 311 and control ports 313 and 315. In this embodiment, the conduit 41b is broken into three sections. The first section of the conduit 41b joins the source 39b to the inlet 307, and the other two sections of the conduit 41b couple the outlets 309 and 311 to the inlet ports 29b, respectively, of the pressure intensifiers 15b and 15b'. The control ports 313 and 315 are coupled by conduits 317 and 319, respectively, to the chamber ports 225b, respectively, of the pressure intensifiers 15b and 15b'. The conduit 43b, which forms a portion of the feedwater inlet conduit, couples the outlet ports 31b of the pressure intensifiers 15b and 15b' to the inlet port 21b of the reverse osmosis filter 13b.

The spool 305 has oppositely facing faces 321 and 323 which confront the control ports 313 and 315, respectively. The spool 305 has two positions. In the lefthand position shown in FIG. 7, the face 321 closes off the control port 313 and allows feedwater under pressure from the source 39b to be supplied to the pressure intensifier 15b. In the righthand position, the face 323 closes the port 315, and the spool allows feedwater from the source 39b to be supplied to the pressure intensifier 15b'.

The control valve 301 has detents 325 (FIG. 8) adjacent the control ports 313 and 315 for releasably retaining the spool 305 in the lefthand and righthand positions, respectively. These detents cause the spool 305 to be, in effect, bistable when the system is in operation. Although the detents 325 can be of any suitable construction, the detent 325 shown in FIG. 8 comprises a ball 327 and a spring 329 retained in a recess 331 of the valve body 303 and a groove 333 in the spool 305.

When the reverse osmosis system 11b is not pressurized, both of the pumping members, which in this embodiment are the pistons 67b, are at bottom dead center; i.e., at the end of the return stroke. For startup, the spool 305 is detented in either its lefthand or righthand position, and in the position shown in FIG. 7, it is detented in the lefthand position. Assuming that the lines have been bled to eliminate air, the operation of the system proceeds as follows.

With the spool 305 moved to the left as shown in FIG. 7, feedwater under pressure from the source 39b is directed through the outlet 309 to the inlet port 29b of the pressure intensifier 15b. Consequently, the pumping member which, in this embodiment, is the piston 67b, moves on the pumping stroke. As described hereinabove, the pressure on the reversing face 78b of the pressure intensifier 15b and, hence, in the reversing chamber 73b is very low and is at drain pressure. Consequently, there is no pressure tending to move the spool 305 to the right out of its detented position.

In order for the spool 305 to be moved to the right to supply feedwater from the source 39b to the water inlet port 29b of the pressure intensifier 15b', two events must occur. First, the piston 67b of the pressure intensifier 15b must reach the end of its pumping stroke to move the brine valve 97b thereof to the position shown in FIG. 6 in which brine at relatively high pressure from the brine outlet port 25b is supplied via a conduit 335 (FIG. 7) to the brine inlet port 33b of the pressure intensifier 15b and through the brine valve 97b to the reversing chamber 73b of the pressure intensifier 15b. This exposes the face 321 of the spool 305 to relatively high brine pressure. Secondly, the piston 67b of the pressure intensifier 15b' must reach the end of the return stroke. At startup, this condition has already been met, and so the brine valve 97b of the pressure intensifier 15b' is in the position shown in FIG. 4 in which the reversing chamber 73b of this pressure intensifier is in communication with drain pressure. Consequently, there is a differential pressure acting on the faces 321 and 323 of the spool 305, and this moves the spool to the right as viewed in FIG. 7 to supply water from the source 13b to the pressure intensifier 15b' and to shut off the supply of water from the source 39b to the pressure intensifier 15b. Of course, the differential pressure acting across the spool 305 is sufficient to force the spool out of one of the detents 325 and into the other of the detents so that the spool 305 acts in essentially a bistable manner.

Subsequent switching of the spool 305 between its two positions is carried out in the same manner. In this regard, the piston 67b which is moving on the return stroke has a relatively high pressure acting in its reversing chamber 73b which urges the spool 305 to a position in which water from the source 39b is being supplied to the other pressure intensifier. Conversely, the reversing chamber 73b of the pressure intensifier moving on the pumping stroke is at drain pressure, and the differential pressure in the reversing chambers 73b of the pressure intensifiers 15b and 15b' is used to place and maintain the spool 305 in a position to supply feedwater under pressure from the source 39b to the pressure intensifier moving on its pumping stroke. Switching of the brine valves 97b at the end of the pumping stroke of one of the pressure intensifiers and at the end of the return stroke of the other pressure intensifier reverses the differential pressure acting on the spool 305 to bring about the supply of feedwater under pressure from the source 39b to the other pressure intensifier. Consequently, the pressure intensifiers are caused to alternately move on pumping and return strokes. Because the return stroke of the piston 67b typically takes less time than the pumping stroke, there is a continuous supply of feedwater at boosted pressure supplied to the inlet port 21b of the reverse osmosis filter 13b.

Although exemplary embodiments of the invention have been shown and described, many changes, modifications and substitutions may be made by one having ordinary skill in the art without necessarily departing from the spirit and scope of this invention.

I claim:

1. A reverse osmosis system comprising:
   a reverse osmosis filter having an inlet port connectible to a source of feedwater under pressure via a feedwater inlet conduit, a product water outlet port for filtered product water and a brine outlet port for brine;
   first and second pressure intensifiers coupled into the feedwater inlet conduit between the source of feedwater and the inlet port of the reverse osmosis filter, each of said pressure intensifiers including a pumping member driven on a pumping stroke by the feedwater under pressure to increase the pressure of the feedwater at the pressure intensifier and to supply feedwater at increased pressure to the reverse osmosis filter via the feedwater inlet conduit, said pumping member being movable on a return stroke;
   control valve means in the feedwater inlet conduit between the source of feedwater and the pressure intensifiers for controlling which of the pressure intensifiers receives feedwater under pressure from the source; and
   said control valve means including means driven by particular fluid pressures in the first and second pressure intensifiers for causing the control valve means to alternately supply feedwater to the first and second pressure intensifiers.

2. A reverse osmosis system as defined in claim 1 wherein the control valve means includes a valve body and a valve element movable in the valve body to control which of the first and second pressure intensifiers receives feedwater under pressure, said valve element having oppositely facing faces coupled to receive said particular pressures, respectively, of the first and second pressure intensifiers.

3. A reverse osmosis system as defined in claim 2 wherein the valve element is a valve spool and said oppositely facing faces are on said spool.

4. A reverse osmosis system as defined in claim 1 wherein each of the pumping members has a reversing face couplable to the brine outlet port of the reverse osmosis filter and said particular pressures are the pressures at the reversing faces.

5. A reverse osmosis system as defined in claim 1 wherein each of the pumping members has a relatively large-area face drivable by the feedwater under pressure, a second smaller area face for increasing the pressure of the feedwater and a reversing face couplable to the brine outlet port of the reverse osmosis filter and said particular pressures are the pressures at the reversing faces.

6. A reverse osmosis system as defined in claim 5 including means for blocking flow of brine from the first pressure intensifier to drain during the return stroke of the pumping member of the first pressure intensifier and means for blocking flow of brine from the second pressure intensifier to drain during the return stroke of the pumping member of the second pressure intensifier.

7. A reverse osmosis system comprising:
   a reverse osmosis filter having an inlet port connectible to a source of feedwater under pressure via a feedwater inlet conduit, a product water outlet port for filtered product water and a brine outlet port for brine;
   first and second pressure intensifiers coupled into the feedwater inlet conduit between the source of feedwater and the inlet port of the reverse osmosis filter, each of said pressure intensifiers including a pumping member driven on a pumping stroke by the feedwater under pressure to increase the pressure of the feedwater at the pressure intensifier and to supply feedwater at increased pressure to the reverse osmosis filter via the feedwater inlet conduit, said pumping member being movable on a return stroke;
   conduit means for coupling the brine outlet port of the reverse osmosis filter to the first and second pressure intensifiers whereby the brine can act on the pumping members of the first and second pressure intensifiers;
   a first brine valve for controlling the flow of brine from the conduit means to the pumping member of the first pressure intensifier;
   a second brine valve for controlling the flow of brine from the conduit means to the pumping member of the second pressure intensifier; and
   control valve means responsive to a first brine pressure between the first brine valve and the pumping member of the first pressure intensifier and a second brine pressure between a second brine valve and the pumping member of the second pressure intensifier for controlling which of the pressure intensifiers receives feedwater under pressure from the source.

8. A reverse osmosis system as defined in claim 7 wherein the control valve means alternately supplies feedwater to the first and second pressure intensifiers.

9. A reverse osmosis system as defined in claim 7 wherein the control valve means includes a valve body and a valve element movable in the valve body to control which of the first and second pressure intensifiers receives feedwater under pressure, said valve element having oppositely facing faces coupled to receive said first and second brine pressures, respectively.

10. A reverse osmosis system as defined in claim 9 wherein the valve element is a valve spool and said oppositely facing faces are on said spool.

11. A reverse osmosis system as defined in claim 7 wherein each of said first and second brine valves block flow of brine from the associated pressure intensifier to drain during the return stroke of the pumping member of the associated pressure intensifier and allows flow of brine from the brine outlet port of the filter to the associated pressure intensifier during the return stroke of the pumping member of the associated pressure intensifier.

12. A system for supplying feedwater under pressure to a reverse osmosis filter which has an inlet port, a product water outlet port for filtered product water and a brine outlet port for brine, said system comprising:
   first and second pressure intensifiers coupable to a source of feedwater under pressure and to the inlet port of the reverse osmosis filter;
   each of said pressure intensifiers including a pumping member driven on a pumping stroke by the feedwater under pressure to increase the pressure of the feedwater at the pressure intensifier so that feedwater at increased pressure can be supplied to the inlet port of the reverse osmosis filter, said pumping member being movable on a return stroke; and
   control valve means responsive to particular fluid pressures in the first and second pressure intensifiers for alternately supplying feedwater to the first and second pressure intensifiers.

13. A system as defined in claim 12 wherein each of the pumping members has a reversing face coupable to the brine outlet port of the reverse osmosis filter and said particular pressures are the pressures at the reversing faces.

14. A system as defined in claim 12 wherein each of the pumping members has a relatively large-area face drivable by the feedwater under pressure, a second smaller area face for increasing the pressure of the feedwater and a reversing face couplable to the brine outlet port of the reverse osmosis filter and said particular pressures are the pressures at the reversing faces.

15. A system for supplying liquid under pressure comprising:
   first and second pressure intensifiers coupable to a source of liquid under pressure;
   each of said pressure intensifiers including a pumping member driven on a pumping stroke by the liquid under pressure to increase the pressure of the liquid under pressure at the pressure intensifier so that the pressure intensifier can supply liquid at increased pressure;
   each of the pumping members having a relatively large area face drivable by the liquid under pressure, a second smaller area face for increasing the pressure of the liquid and a reversing face opposing the large area face; and
   a control valve responsive to the pressures at the reversing faces for alternately supplying liquid from the source to the first and second pressure intensifiers.

16. A system as defined in claim 15 wherein the control valve means includes a valve body and a valve element movable in the valve body to control which of the first and second pressure intensifiers receives feedwater under pressure, said valve element having oppositely facing faces coupled to receive said particular pressures, respectively, of the first and second pressure intensifiers.

* * * * *

UNITED STATES PATENT AND TRADEMARK OFFICE
CERTIFICATE OF CORRECTION

PATENT NO. : 5,154,820

DATED : October 13, 1992

INVENTOR(S) : Donald F. Solomon

It is certified that error appears in the above-identified patent and that said Letters Patent is hereby corrected as shown below:

Column 1, line 11, before "21, 1987" insert -- October -- .

Signed and Sealed this

Nineteenth Day of October, 1993

Attest:

BRUCE LEHMAN

*Attesting Officer*     *Commissioner of Patents and Trademarks*